(12) United States Patent
Lee et al.

(10) Patent No.: US 10,325,140 B2
(45) Date of Patent: Jun. 18, 2019

(54) FINGERPRINT IDENTIFICATION APPARATUS

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 131 days.

(21) Appl. No.: 15/643,953

(22) Filed: Jul. 7, 2017

(65) Prior Publication Data
US 2018/0025209 A1    Jan. 25, 2018

(30) Foreign Application Priority Data
Jul. 25, 2016  (TW) .............................. 105123490 A

(51) Int. Cl.
*G06K 9/00* (2006.01)

(52) U.S. Cl.
CPC ....... *G06K 9/00087* (2013.01); *G06K 9/0002* (2013.01)

(58) Field of Classification Search
None
See application file for complete search history.

(56) References Cited

U.S. PATENT DOCUMENTS

| 4,550,221 A | 10/1985 | Mabusth | |
|---|---|---|---|
| 6,462,563 B1 * | 10/2002 | Kawahara | G06K 9/0002 324/662 |
| 10,042,467 B2 * | 8/2018 | Schwartz | G06F 3/0416 |
| 2012/0092350 A1 * | 4/2012 | Ganapathi | G02B 26/0833 345/501 |
| 2014/0047706 A1 * | 2/2014 | Shaikh | G06K 9/0002 29/622 |

FOREIGN PATENT DOCUMENTS

| TW | 201230161 A1 | 7/2012 |
|---|---|---|
| TW | M513407 U | 12/2015 |
| TW | I543087 B | 7/2016 |

OTHER PUBLICATIONS

Office Action dated Feb. 24, 2017 of the corresponding Taiwan patent application.

* cited by examiner

*Primary Examiner* — Hadi Akhavannik
(74) *Attorney, Agent, or Firm* — Chun-Ming Shih; HDLS IPR Services

(57) ABSTRACT

A fingerprint identification apparatus includes a substrate, a second electrode layer, and a first electrode layer. The first electrode layer includes parallel first electrodes, and at least parts of the first electrodes have openings or dents. The second electrode layer includes parallel second electrodes and the second electrodes cross with the first electrodes on the substrate, where the openings or the dents are defined at the cross points from projected view. The second electrode is applied with transmitting signal and the corresponding electric field lines are received by the first electrode. The electric field lines detouring the edges of the first electrodes, or detouring the openings (or the dents) have induction with the finger close to or touching the first electrodes. The number of the effective electric field lines and the effective mutual capacitance changes can be increased to enhance the fingerprint sensing accuracy.

20 Claims, 17 Drawing Sheets

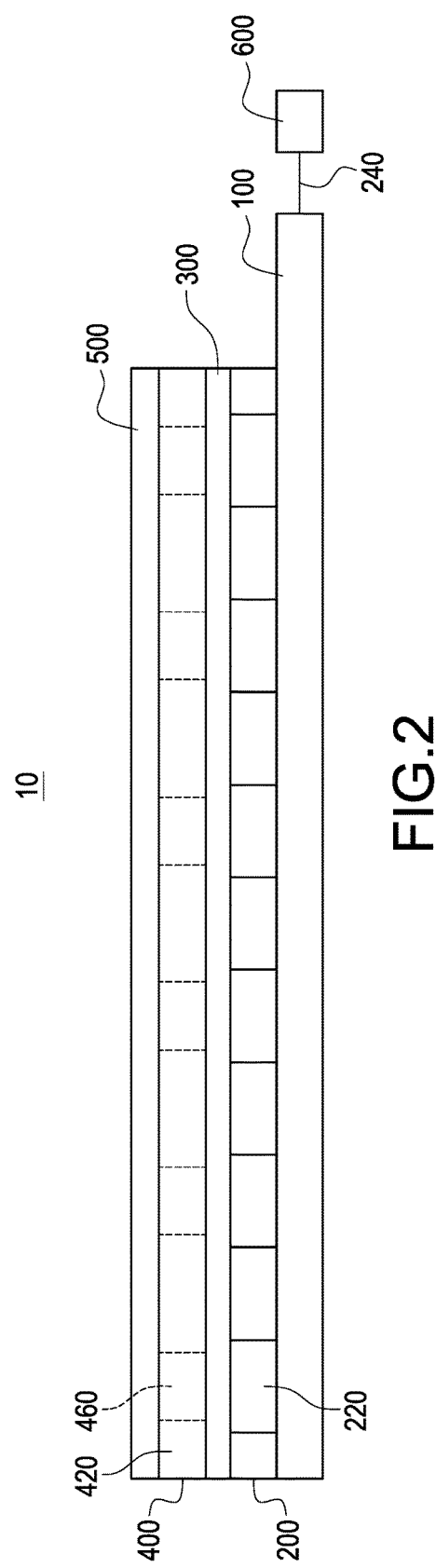

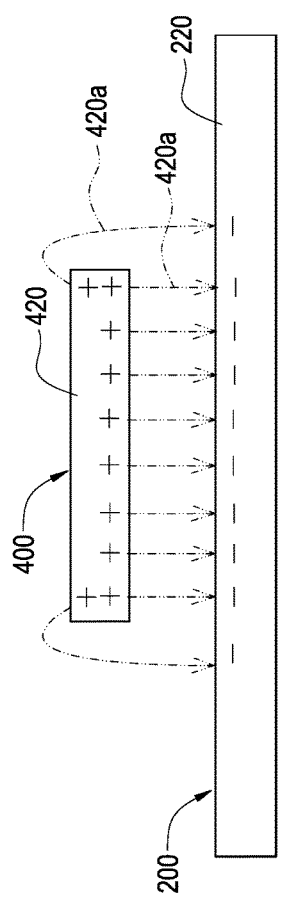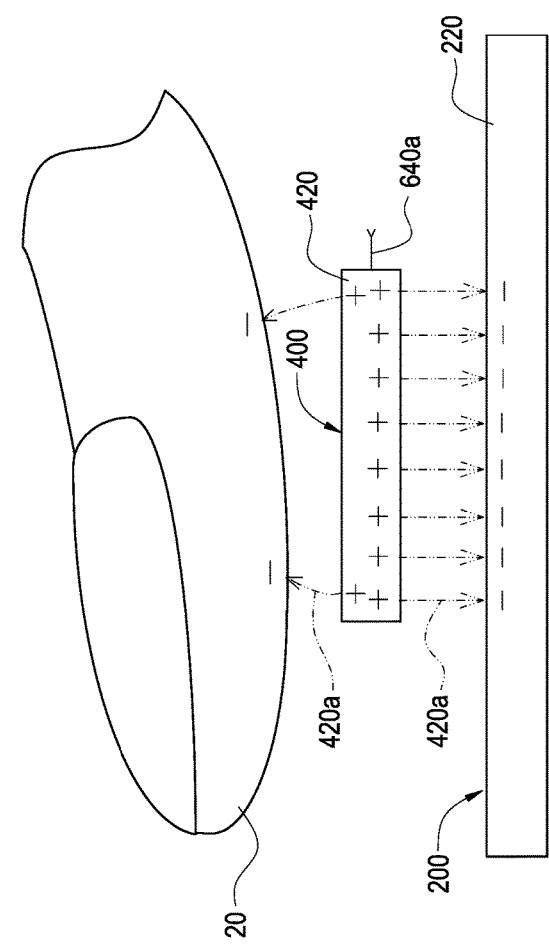

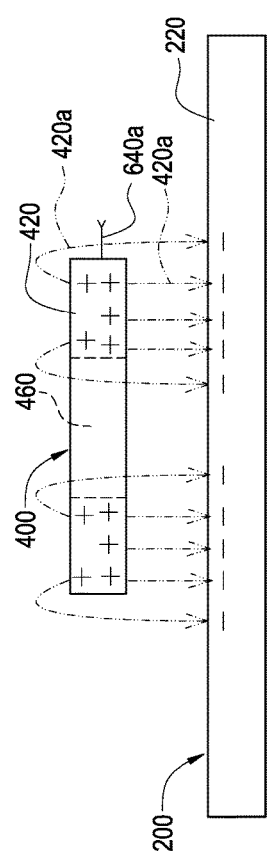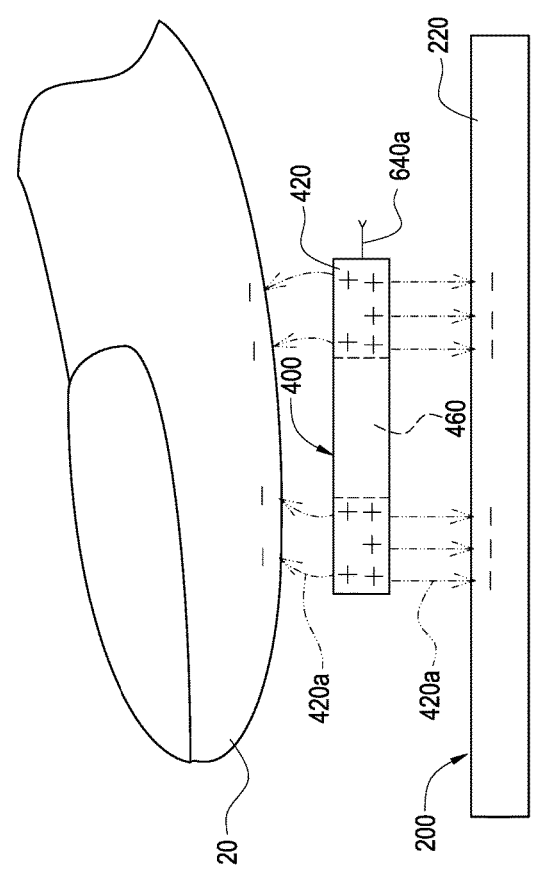

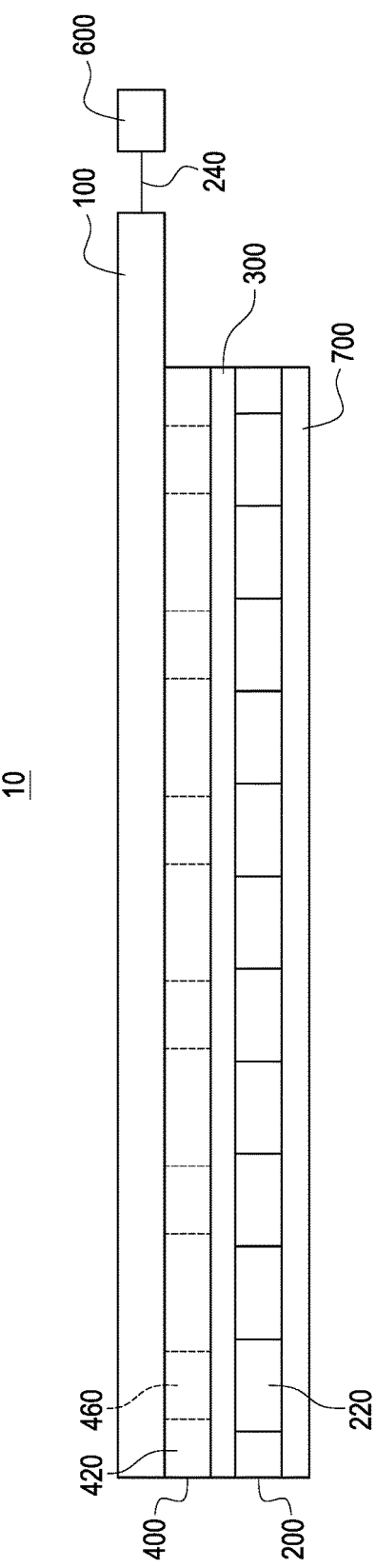

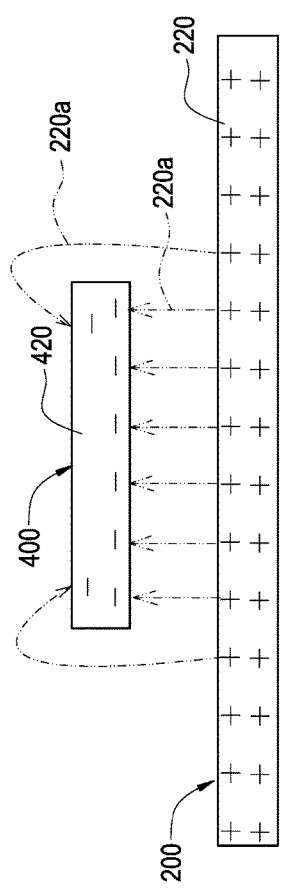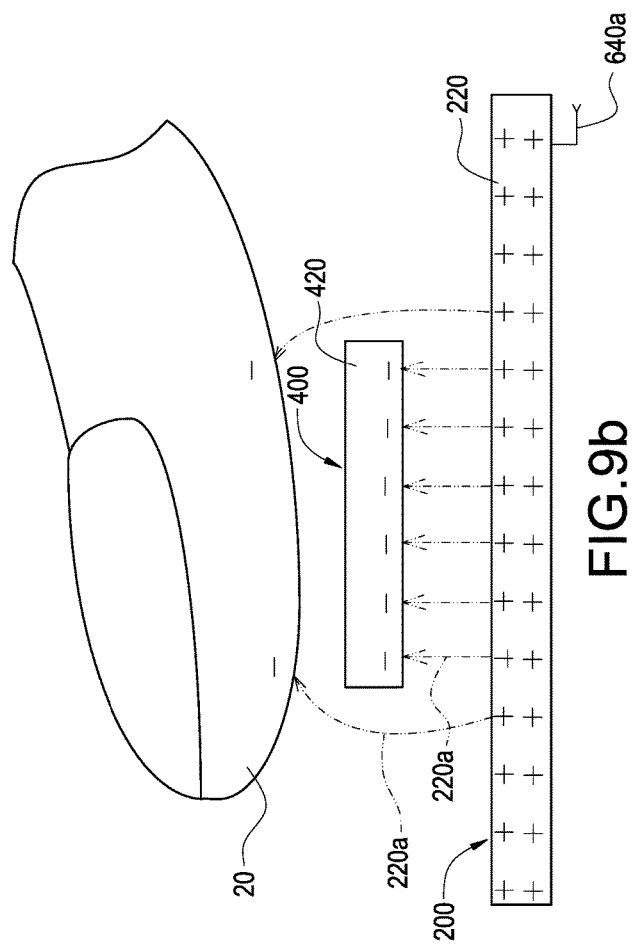

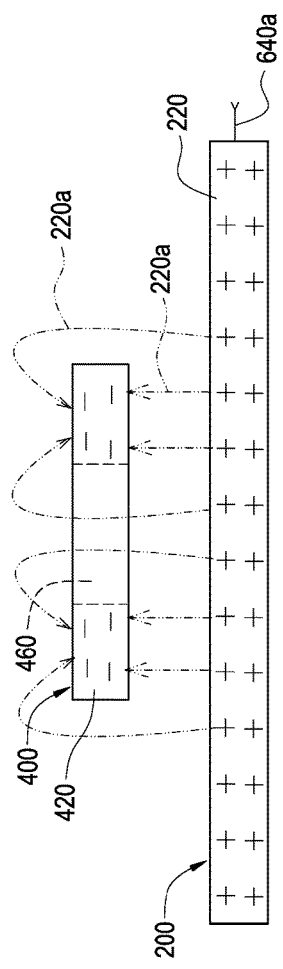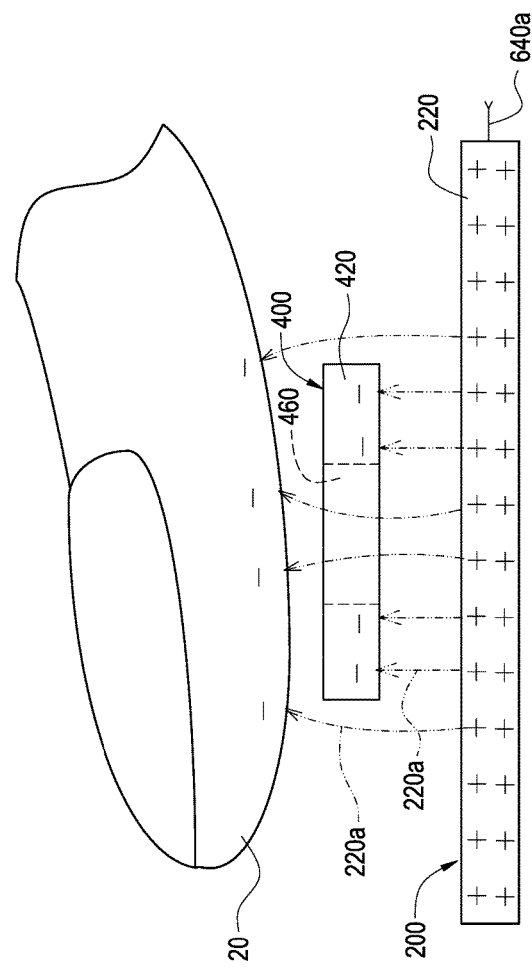

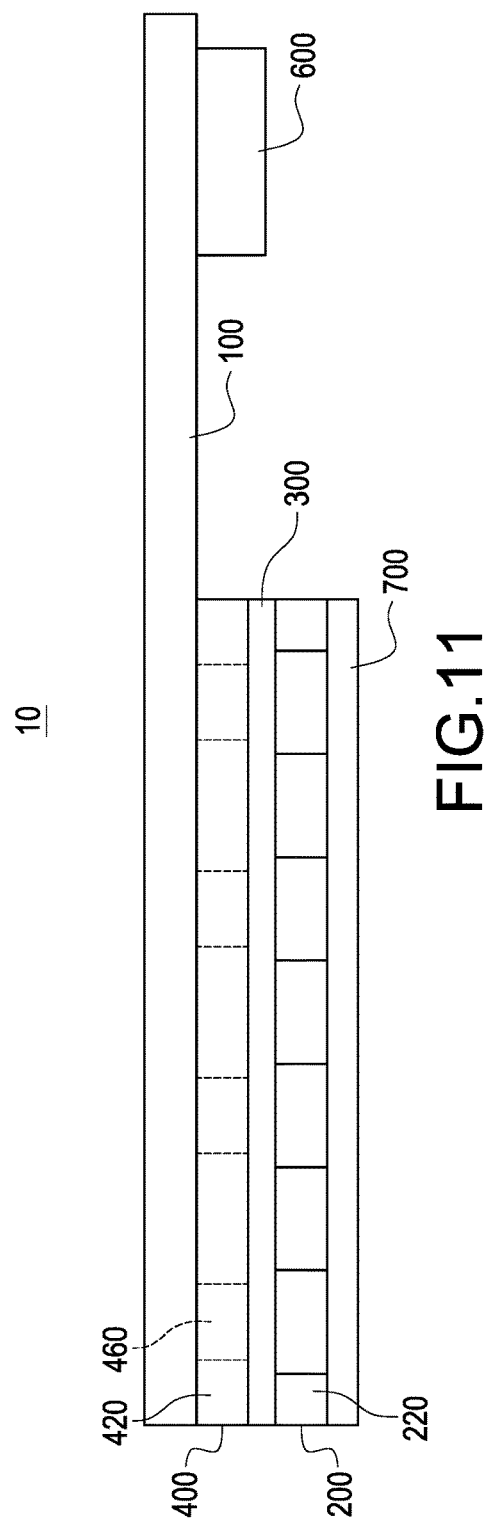

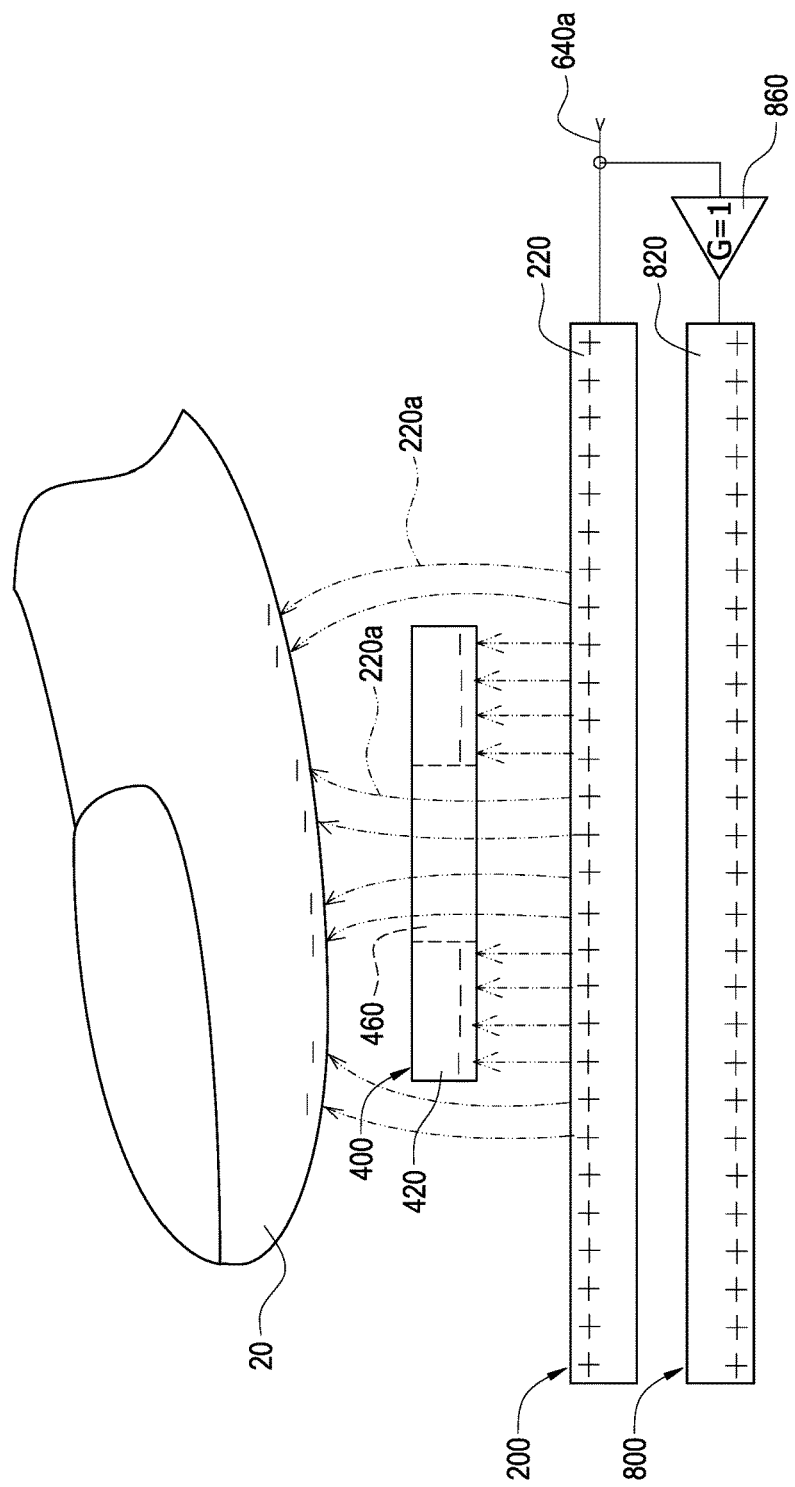

FINGERPRINT IDENTIFICATION APPARATUS

BACKGROUND OF THE INVENTION

Field of the Invention

The present invention relates to a biometric identification apparatus, especially to a fingerprint identification apparatus.

Description of Prior Art

Biometric identification technologies have rapid development due to the strong demand from electronic security applications and remote payment. The biometric identification technologies can be classified into fingerprint identification, iris identification and DNA identification and so on. For the considerations of efficiency, safety and non-invasiveness, the fingerprint identification becomes main stream technology. The fingerprint identification device can scan fingerprint image by optical scanning, thermal imaging or capacitive imaging. For cost, power-saving, reliability and security concerns, the capacitive fingerprint sensor becomes popular for biometric identification technology applied to portable electronic devices.

The conventional capacitive fingerprint sensors can be classified into swipe type and area type (pressing type), and the area type has better identification correctness, efficiency and convenience. However, the area type capacitive fingerprint sensor generally integrates the sensing electrodes and the sensing circuit into one integrated circuit (IC) because the sensed signals are minute and the background noise is huge in comparison with the minute sensed signals. In conventional area type technique, holes are defined on the protection glass of the display to arrange the fingerprint identification IC chip therein and sapphire film is used to cover and protect the fingerprint identification IC chip. Through-silicon via (TSV) technique is used to lead the conductive wires to backside of the fingerprint identification IC chip. As a result, the material cost and package cost is high while the yield is influenced. There are development trends to simply the package the fingerprint identification IC chip and to enhance the sensing ability. The fingerprint identification IC chip is desirably packaged under the protection glass to reduce cost and enhance product lifetime/durability.

SUMMARY OF THE INVENTION

It is the object of the present invention to provide a fingerprint identification apparatus with low cost and high accuracy.

Accordingly, the present invention provides a fingerprint identification apparatus, comprising: a substrate; a plurality of parallel first electrodes, at least part of the first electrodes having a plurality of openings or dents; a plurality of parallel second electrodes; wherein the first electrodes and the second electrodes are cross to each other from projected view and the openings or dents are defined at overlapped regions of the first electrodes and the second electrodes from projected view.

According to one aspect of the present invention, the fingerprint identification apparatus further comprises an insulation layer between the first electrodes and the second electrodes to electrically isolate the first electrodes and the second electrodes.

According to another aspect of the present invention, the first electrodes are arranged on a side of the second electrodes toward user finger.

According to still another aspect of the present invention, the fingerprint identification apparatus further comprises a plurality of auxiliary transmitting electrodes, the auxiliary transmitting electrodes being in one by one relationship with the second electrodes and arranged on a side of the corresponding second electrode opposite to the user finger.

According to still another aspect of the present invention, the fingerprint identification apparatus further comprises a plurality of connection wires and a plurality of contacts, part of the connection wires and the contacts being corresponding to and electrically connected to the first electrodes or the second electrodes.

According to still another aspect of the present invention, the fingerprint identification apparatus further comprises a fingerprint sensing integrated circuit (IC) having a plurality of contacts, part of the contacts being electrically connected to the first electrodes and the second electrodes.

According to still another aspect of the present invention, the substrate is a glass substrate, a ceramic substrate, a polymer substrate or a sapphire substrate.

According to still another aspect of the present invention, the substrate is a protection cover of a display screen.

According to still another aspect of the present invention, the first electrodes are substantially perpendicular to the second electrodes.

According to still another aspect of the present invention, at least part of the second electrodes have a plurality of openings or a plurality of dents defined at the overlapped regions, wherein locations of the openings or dents of the second electrodes are complementary with locations of the openings or dents of the first electrodes.

According to still another aspect of the present invention, the fingerprint sensing integrated circuit (IC) comprises at least one mutual-capacitance sensing circuit, the mutual-capacitance sensing circuit is configured to sequentially or randomly apply a transmitting signal to at least one of the first electrodes and sequentially or randomly receive a fingerprint sensing signal from at least one of the second electrodes.

According to still another aspect of the present invention, the fingerprint sensing integrated circuit (IC) comprises at least one mutual-capacitance sensing circuit, the mutual-capacitance sensing circuit is configured to sequentially or randomly apply a transmitting signal to at least one of the second electrodes and sequentially or randomly receive a fingerprint sensing signal from at least one of the first electrodes.

According to still another aspect of the present invention, the fingerprint identification apparatus further comprises a fingerprint sensing integrated circuit (IC) having a plurality of contacts, part of the contacts being electrically connected to the first electrodes, the second electrodes and the auxiliary transmitting electrodes.

According to still another aspect of the present invention, the fingerprint sensing IC comprises at least one mutual-capacitance sensing circuit, the mutual-capacitance sensing circuit is configured to sequentially or randomly apply a transmitting signal to at least one of the second electrodes, apply an auxiliary transmitting signal with the same phase as the transmitting signal to the corresponding auxiliary transmitting electrode and sequentially or randomly receive a fingerprint sensing signal from at least one of the first electrodes.

According to still another aspect of the present invention, the fingerprint sensing IC is pressed on the substrate through anisotropic conductive film (ACF).

According to still another aspect of the present invention, the fingerprint sensing IC is fingerprint sensing IC chip and soldered to the substrate through low-melting-temperature alloy material.

According to still another aspect of the present invention, the fingerprint sensing IC is fingerprint sensing IC chip and arranged on a flexible circuit board, the flexible circuit board is pressed adhered to or soldered to the substrate.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

FIG. 2 shows a sectional view of the fingerprint identification apparatus according to the first embodiment of the present invention.

FIGS. 3a and 3b are schematic views showing the flowing status of electric field lines when the fingerprint identification apparatus is not touched and is touched by finger.

FIGS. 4a and 4b are schematic views showing the flowing status of electric field lines when the fingerprint identification apparatus is not touched and is touched by finger.

FIG. 5 is a sectional view of the fingerprint identification apparatus according to the second embodiment of the present invention.

FIGS. 9a and 9b are schematic views showing the flowing status of electric field lines when the fingerprint identification apparatus is not touched and is touched by finger.

FIGS. 10a and 10b are schematic views showing the flowing status of electric field lines when the fingerprint identification apparatus is not touched and is touched by finger.

FIG. 11 is a sectional view of the fingerprint identification apparatus according to the sixth embodiment of the present invention.

FIGS. 15a and 15b are schematic views showing the flowing status of electric field lines when the fingerprint identification apparatus is not touched and is touched by finger.

DETAILED DESCRIPTION OF THE INVENTION

Figure 1:
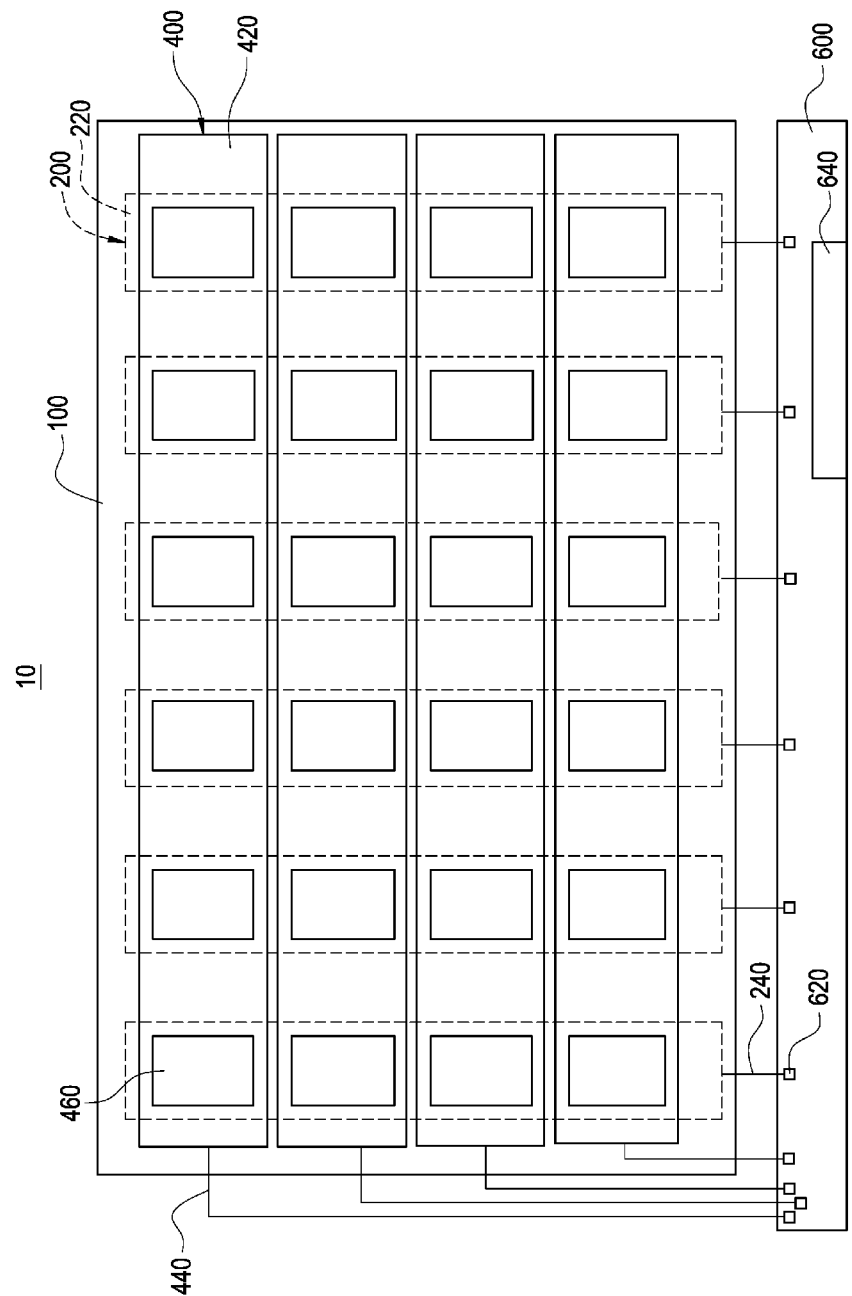
FIG. 1 shows a top view of the fingerprint identification apparatus according to a first embodiment of the present invention.

FIG. 1 shows a top view of the fingerprint identification apparatus according to a first embodiment of the present invention, and FIG. 2 shows a sectional view of the fingerprint identification apparatus according to the first embodiment of the present invention. As shown in these figures, the fingerprint identification apparatus 10 of the present invention comprises a substrate 100, a second electrode layer 200, an insulation layer 300, a first electrode layer 400, a protection layer 500 and a fingerprint sensing integrated circuit (IC) 600. The first electrode layer 400 comprises a plurality of first electrodes 420 and the second electrode layer 200 comprises a plurality of second electrodes 220 overlapped with the first electrodes 420 from projected view (as shown in FIG. 1). The first electrode layer 400 has a plurality of openings or dents corresponding to the overlapped region such that the number of the effective electric field lines and the effective mutual capacitance changes can be increased to enhance the fingerprint sensing accuracy. In the embodiment shown in FIGS. 1 and 2, the substrate 100 is a glass substrate, a ceramic substrate, a polymer substrate or a sapphire substrate, alternatively, the substrate 100 is a protection cover of a display screen.

The second electrode layer 200 is arranged on one side of the substrate 100 and comprises a plurality of second electrodes 220, where each of the second electrodes 220 electrically connects to a connection wire 240. The second electrodes 220 are parallel to each other and arranged on one side of the substrate 100. As shown in FIGS. 1 and 2, the second electrode layer 200 is transmitting electrode layer or receiving electrode layer.

The insulation layer 300 is arranged on one face of the second electrode layer 200 and between the second electrode layer 200 and the first electrode layer 400, thus electrically isolates the second electrode layer 200 and the first electrode layer 400.

The first electrode layer 400 is arranged on one side of the insulation layer 300 and comprises a plurality of first electrodes 420, where each of the first electrodes 420 electrically connects to a connection wire 440. The first electrodes 420 are parallel to each other and arranged on one side of the insulation layer 300 and closer to the user finger in comparison with the second electrodes 220. The first electrode layer 400 has a plurality of openings 460 defined on an overlapped region, where one second electrode 220 is overlapped with one first electrode 420 from projected view, and electric field lines pass through the openings 460 to increase the number of effective electric field lines for sensing fingerprint of user finger and increase the variation amount of effective mutual capacitance, thus enhancing the accuracy and sensibility of fingerprint sensing. As shown in FIG. 1, the second electrodes 220 of the second electrode layer 200 are substantially perpendicular to the first electrodes 420 of the first electrode layer 400. The first electrode layer 400 is transmitting electrode layer or receiving electrode layer.

The protection layer 500 is arranged on one side of the first electrode layer 400 to form a protection layer for the first electrode layer 400 and prevent the first electrode layer 400 from scratch by foreign objects or moisture. The protection layer 500 may have pattern or graph thereon to provide visual effect.

The fingerprint sensing IC 600 further comprises a plurality of contacts 620, where part of the contacts 620 electrically connect to the connection wires 440, 240 of the first electrodes 420 and the second electrodes 220. The fingerprint sensing IC 600 comprises at least one mutual-capacitance sensing circuit 640. The mutual-capacitance sensing circuit 640 sequentially or randomly applies a transmitting signal to at least one first electrode 420 of the first electrode layer 400, and sequentially or randomly receives (senses) a fingerprint sensing signal from at least one second electrode 220 of the second electrode layer 200. In this embodiment, the fingerprint sensing IC 600 is a fingerprint sensing IC chip.

FIGS. 3a and 3b are schematic views showing the flowing status of electric field lines when the fingerprint identification apparatus is not touched and is touched by finger, where the first electrode layer 400 does not have opening. As shown in those figures, the first electrode layer 400 is transmitting electrode layer and the second electrode layer 200 is receiving electrode layer. The first electrode layer 400 does not have openings corresponding to the overlapped region between the second electrodes 220 and the first electrodes 420 from projected view. The mutual-capacitance sensing circuit 640 (as shown in FIG. 1) sequentially or randomly applies a transmitting signal 640a to the first electrodes 420 of the first electrode layer 400, and the first electrodes 420 generates electric field lines 420a with directions toward the second electrodes 220 and received by the second electrodes 220. Most part of the electric field lines 420a directly flow to one face of the second electrode 220 while part of the electric field lines 420a detour the edge of the first electrode 420 and then received by the second electrode 220.

Therefore, when user finger 20 touches or approaches the first electrode layer 400, the electric field lines 420a originally detouring the edge of the first electrode 420 will be influenced by the touching or approaching finger 20 and corresponding capacitance change occurs to facilitate the sensing of fingerprint.

FIGS. 4a and 4b are schematic views showing the flowing status of electric field lines when the fingerprint identification apparatus is not touched and is touched by finger according to the first embodiment of the present invention. As shown in those figures, the first electrode layer 400 is transmitting electrode layer and the second electrode layer 200 is receiving electrode layer. The first electrode layer 400 has openings 460 corresponding to the overlapped region between the second electrodes 220 and the first electrodes 420 from projected view. The mutual-capacitance sensing circuit 640 (as shown in FIG. 1) sequentially or randomly applies a transmitting signal 640a to the first electrodes 420 of the first electrode layer 400, and the first electrodes 420 generates electric field lines 420a with directions toward the second electrodes 220 and received by the second electrodes 220. Part of the electric field lines 420a directly flow to one face of the second electrode 220, another part of the electric field lines 420a detour the edge of the first electrode 420 and are then received by the second electrode 220, still another part of the electric field lines 420a pass the openings 460 or detour the edges of the openings 460 and are then received by the second electrode 220.

Therefore, when user finger 20 touches or approaches the first electrode layer 400, the electric field lines 420a originally detouring the edge of the first electrode 420 (or originally detouring the edge of the openings 460 or passing the openings 460) will be influenced by the touching or approaching finger 20 and corresponding capacitance change occurs to facilitate the sensing of fingerprint.

By the design and provision of the openings 460, the number of the effective electric field lines and the effective mutual capacitance changes can be increased to enhance the fingerprint sensing accuracy.

FIG. 5 is a sectional view of the fingerprint identification apparatus according to the second embodiment of the present invention. The embodiment shown in this figure is similar to the embodiment shown in FIGS. 1, 2, 4a, and 4b. However, in the embodiment shown in FIG. 5, the substrate 100 of the fingerprint identification apparatus 10 is arranged on one side of the first electrode layer 400 and employed as the protection layer or the decoration layer of the fingerprint identification apparatus. The first electrode layer 400 receives the transmitting signal sent from the mutual-capacitance sensing circuit 640 (as shown in FIG. 1) of the fingerprint sensing IC 600 and then generates electric field lines (not shown) directed toward the second electrodes 220 of the second electrode layer 200. Therefore, when user finger touches or approaches the first electrode layer 400, the electric field lines originally detouring the edge of the first electrode 420 (or originally detouring the edge of the openings 460 or passing the openings 460) will be influenced by the touching or approaching finger and corresponding capacitance change occurs to facilitate the sensing of fingerprint.

When the substrate 100 is employed as the protection layer or decoration layer, the fingerprint identification apparatus 10 has a packaging layer 700 on a face of the second electrode layer 200. The packaging layer 700 is used to prevent the second electrode layer 200 of the fingerprint identification apparatus 10 from moisture or damage by foreign object.

Figure 6:
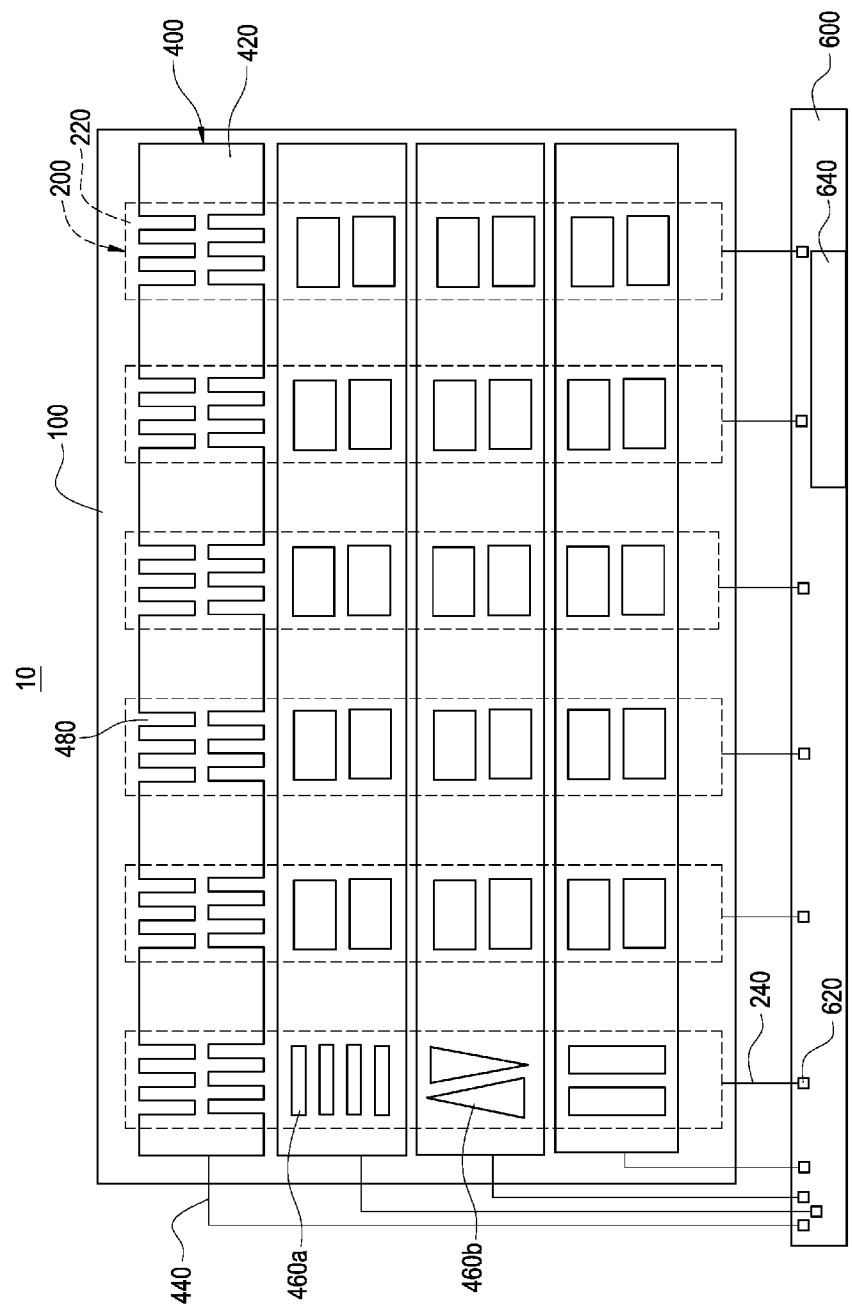
FIG. 6 is a top view of the fingerprint identification apparatus according to the third embodiment of the present invention.

FIG. 6 is a top view showing the fingerprint identification apparatus 10 according to the third embodiment of the present invention. The embodiment shown in this figure is similar to the embodiment shown in FIGS. 1, 2, 4a, and 4b. However, in the embodiment shown in FIG. 6, the openings 460 defined corresponding to the overlapped region between the second electrodes 220 and the first electrodes 420 from projected view have different geometric shapes such as openings 460a with rectangular shape or openings 460b with triangular shape. By the design and provision of the openings 460, the number of the effective electric field lines and the effective mutual capacitance changes can be increased to enhance the fingerprint sensing accuracy. Besides, part or all of the openings 460 defined corresponding to the overlapped region between the second electrodes 220 and the first electrodes 420 from projected view can be replaced by dents 480, which are individually or continually disposed. Similarly, by the dents 480, the number of the effective electric field lines and the effective mutual capacitance changes can be increased to enhance the fingerprint sensing accuracy.

Figure 7:
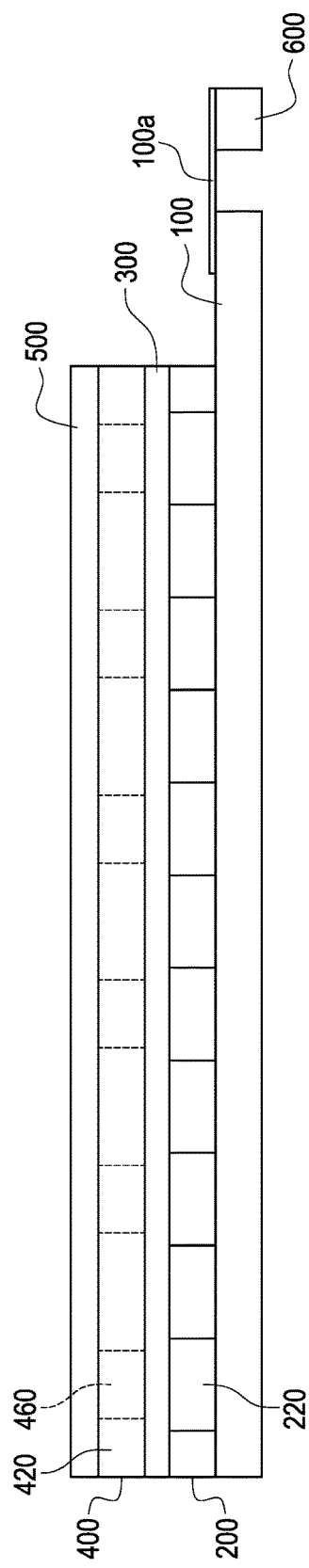
FIG. 7 is a sectional view of the fingerprint identification apparatus according to the fourth embodiment of the present invention.

FIG. 7 is a sectional view showing the fingerprint identification apparatus 10 according to the fourth embodiment of the present invention. The embodiment shown in this figure is similar to the embodiment shown in FIGS. 1, 2, 4a, and 4b. However, in the embodiment shown in FIG. 7, the fingerprint sensing IC 600 in chip form is electrically connected to a flexible circuit board 100a, and the flexible circuit board 100a is adhered to (or pressed on) or soldered to the substrate 100 such that the fingerprint sensing IC 600 has electrical connection with the first electrode layer 400 and the second electrode layer 200 through the flexible circuit board 100a and the substrate 100. The mutual-capacitance sensing circuit 640 (as shown in FIG. 1) of the fingerprint sensing IC 600 applies the transmitting signal to the first electrode layer 400, and the first electrode layer 400 then generates electric field lines directed toward the second electrodes 220 of the second electrode layer 200.

Figure 8:
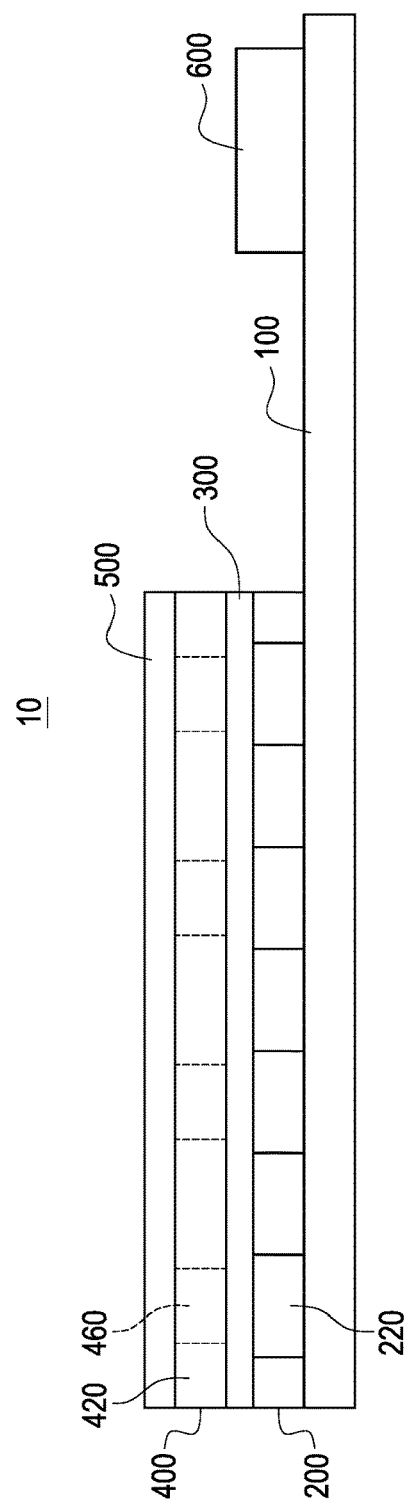
FIG. 8 is a sectional view of the fingerprint identification apparatus according to the fifth embodiment of the present invention.

FIG. 8 is a sectional view showing the fingerprint identification apparatus 10 according to the fifth embodiment of the present invention. The embodiment shown in this figure is similar to the embodiment shown in FIGS. 1, 2, 4*a*, and 4*b*. However, in the embodiment shown in FIG. 8, the second electrode layer 200 is transmitting electrode layer while the first electrode layer 400 is the receiving electrode layer. The fingerprint sensing IC 600 in chip form is adhered to the substrate 100 with ACF (Anisotropic Conductive Film) or soldered to the substrate 100 through using low-melting-temperature alloy material. The mutual-capacitance sensing circuit 640 (as shown in FIG. 1) of the fingerprint sensing IC 600 sequentially or randomly applies the transmitting signal to at least one second electrode 220 of the second electrode layer 200, and then sequentially or randomly receives a fingerprint sensing signal from at least one first electrode 420 of the first electrode layer 400 for conducting fingerprint sensing.

FIGS. 9*a* and 9*b* are schematic views showing the flowing status of electric field lines when the fingerprint identification apparatus is not touched and is touched by finger, where the first electrode layer 400 does not have opening. As shown in those figures, the second electrode layer 200 is transmitting electrode layer and the firth electrode layer 400 is receiving electrode layer. The first electrode layer 400 does not have openings corresponding to the overlapped region between the second electrodes 220 and the first electrodes 420 from projected view. The mutual-capacitance sensing circuit 640 (as shown in FIG. 1) sequentially or randomly applies a transmitting signal 640*a* to the second electrodes 220 of the second electrode layer 200, and the second electrodes 220 generates electric field lines 220*a* with directions toward the first electrodes 420 and received by the first electrodes 420. Most part of the electric field lines 220*a* directly flow to one face of the first electrode 420 while part of the electric field lines 220*a* detour the edge of the first electrode 420 and then received by the first electrode 420.

Therefore, when user finger 20 touches or approaches the first electrode layer 400, the electric field lines 220*a* originally detouring the edge of the first electrode 420 will be influenced by the touching or approaching finger 20 and corresponding capacitance change occurs to facilitate the sensing of fingerprint.

FIGS. 10*a* and 10*b* are schematic views showing the flowing status of electric field lines when the fingerprint identification apparatus is not touched and is touched by finger according to the fifth embodiment of the present invention. As shown in those figures, the second electrode layer 200 is transmitting electrode layer and the first electrode layer 400 is receiving electrode layer. The first electrode layer 400 has openings 460 corresponding to the overlapped region between the second electrodes 220 and the first electrodes 420 from projected view. The mutual-capacitance sensing circuit 640 (as shown in FIG. 1) sequentially or randomly applies a transmitting signal 640*a* to the second electrodes 220 of the second electrode layer 200, and the second electrodes 220 generates electric field lines 220*a* with directions toward the first electrodes 420 and received by the first electrodes 420. Part of the electric field lines 220*a* directly flow to one face of the first electrode 420, another part of the electric field lines 220*a* detour the edge of the first electrode 420 and are then received by the another face of the first electrode 420, still another part of the electric field lines 220*a* pass the openings 460 or detour the edges of the openings 460 and are then received by another face of the first electrode 420.

Therefore, when user finger 20 touches or approaches the first electrode layer 400, the electric field lines 220*a* originally detouring the edge of the first electrode 420 (or originally detouring the edge of the openings 460 or passing the openings 460) will be influenced by the touching or approaching finger 20 and corresponding capacitance change occurs to facilitate the sensing of fingerprint. By the design and provision of the openings 460 or the dents 480, the number of the effective electric field lines and the effective mutual capacitance changes can be increased to enhance the fingerprint sensing accuracy.

FIG. 11 is a sectional view of the fingerprint identification apparatus according to the sixth embodiment of the present invention. The embodiment shown in this figure is similar to the embodiment shown in FIGS. 8, 10*a*, and 10*b*. However, in the embodiment shown in FIG. 11, the substrate 100 of the fingerprint identification apparatus 10 is arranged on one side of the first electrode layer 400 and employed as the protection layer or the decoration layer of the fingerprint identification apparatus. The second electrode layer 200 receives the transmitting signal sent from the mutual-capacitance sensing circuit 640 (as shown in FIG. 1) of the fingerprint sensing IC 600 and then generates electric field lines (not shown) directed toward the first electrodes 420 of the first electrode layer 400. Therefore, when user finger touches or approaches the first electrode layer 400, the electric field lines originally detouring the edge of the first electrode 420 (or originally detouring the edge of the openings 460 or passing the openings 460) will be influenced by the touching or approaching finger and corresponding capacitance change occurs to facilitate the sensing of fingerprint.

When the substrate 100 is employed as the protection layer or decoration layer, the fingerprint identification apparatus 10 has a packaging layer 700 on a face of the second electrode layer 200. The packaging layer 700 is used to prevent the second electrode layer 200 of the fingerprint identification apparatus 10 from moisture or damage by foreign object.

Figure 12:
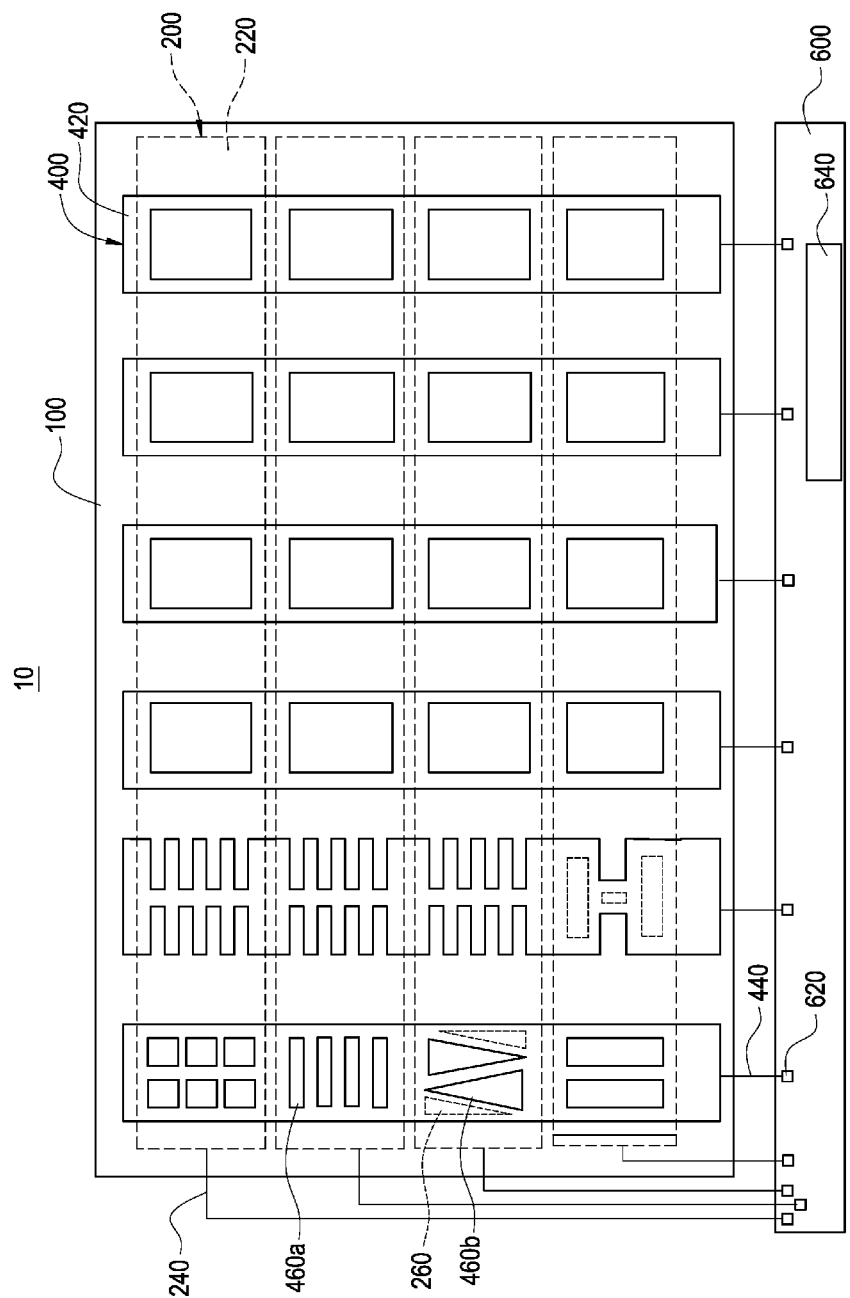
FIG. 12 is a top view of the fingerprint identification apparatus according to the seventh embodiment of the present invention.

FIG. 12 is a top view showing the fingerprint identification apparatus 10 according to the seventh embodiment of the present invention. The embodiment shown in this figure is similar to the embodiment shown in FIGS. 1, 2, 4*a*, and 4*b*. However, in the embodiment shown in FIG. 12, the second electrode layer 200 has openings 260 (or dents) defined corresponding to the overlapped region between the second electrodes 220 and the first electrodes 420 from projected view, and the locations of the openings 260 (or dents) are complementary with the locations of the openings 460 on the first electrode layer 400.

The mutual-capacitance sensing circuit 640 (as shown in FIG. 1) sequentially or randomly applies a transmitting signal to the second electrodes 220 of the second electrode layer 200, and the second electrodes 220 generates electric field lines with directions toward the first electrodes 420 and received by the first electrodes 420. Part of the electric field lines detour the edge of the second electrode 220 or detour the edge of the opening 260 and then received by the first electrode 420. Another part of the electric field lines detour the edge of the first electrode 420 or detour the edge of the opening 460 and then received by the first electrode 420.

Figure 13:
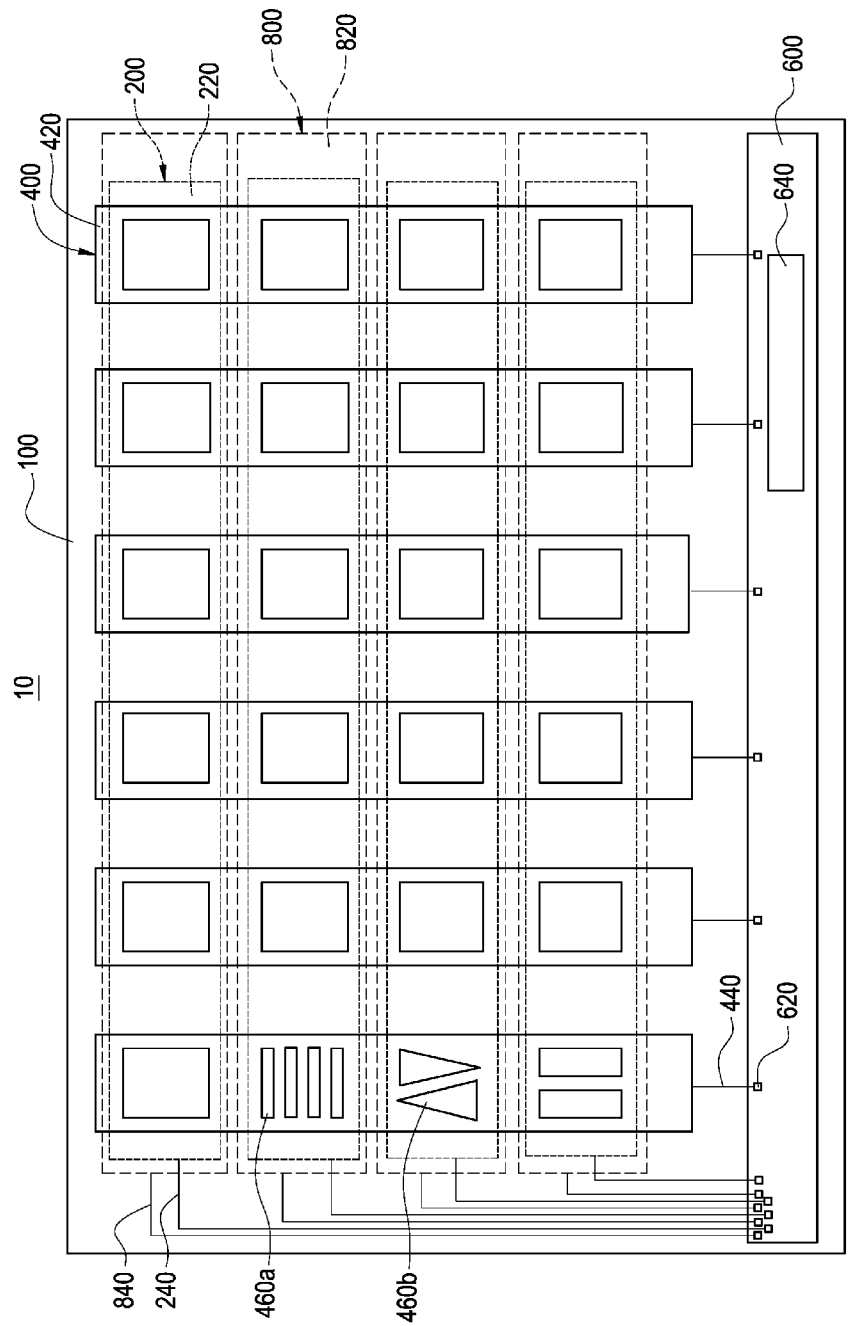
FIG. 13 is a top view of the fingerprint identification apparatus according to the eighth embodiment of the present invention.
Figure 14:
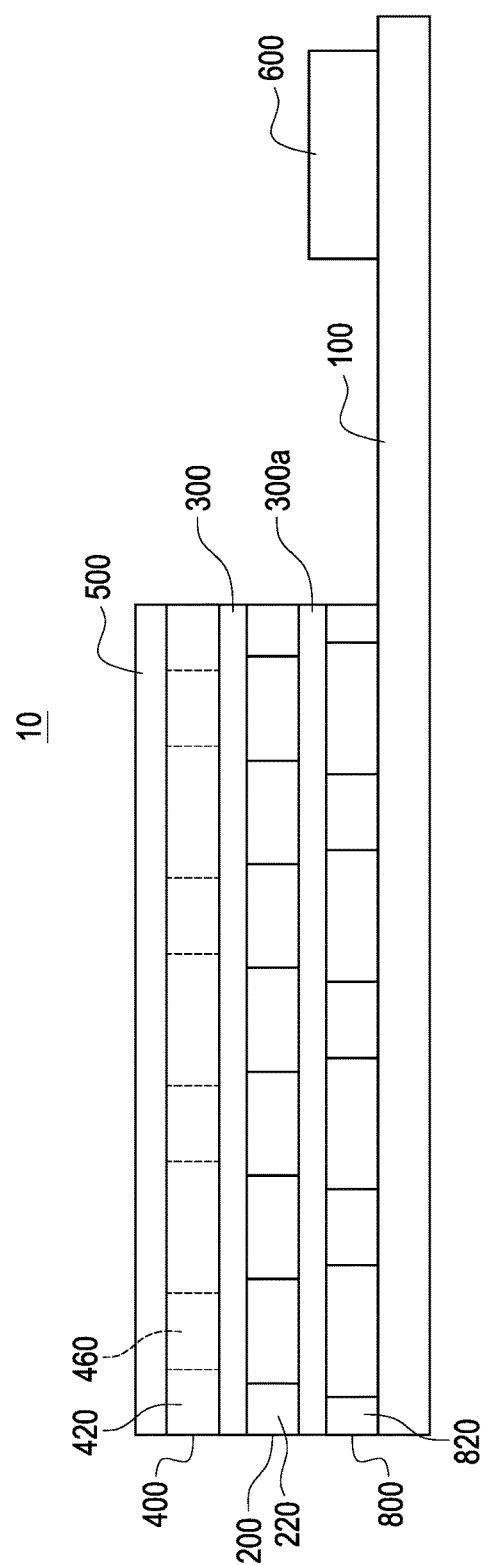
FIG. 14 is a sectional view of the fingerprint identification apparatus corresponding to FIG. 13.

FIG. 13 is a top view showing the fingerprint identification apparatus 10 according to the eighth embodiment of the present invention, and FIG. 14 is a sectional view corresponding to FIG. 13. As shown in those figures, the fingerprint identification apparatus 10 of this embodiment is similar to that shown in FIG. 12, however, the fingerprint identification apparatus 10 of this embodiment further comprises an auxiliary transmitting electrode layer 800 arranged between the substrate 100 and the second electrode layer 200, where an insulation layer 300a is provided between the auxiliary transmitting electrode layer 800 and the second electrode layer 200 to provide electric isolation between the auxiliary transmitting electrode layer 800 and the second electrode layer 200. The auxiliary transmitting electrode layer 800 comprises a plurality of parallel auxiliary transmitting electrodes 820 arranged on one face of the substrate 100. The auxiliary transmitting electrodes 820 are in one by one relationship with the second electrodes 220 and are on one side of the second electrodes 220 opposite to user finger. The auxiliary transmitting electrode layer 800 facilitates the electric field lines of the second electrode layer 200 to direct toward the first electrode layer 400 to be received by the first electrode layer 400, thus prevent from influence of other signal sources. In the shown embodiment, the area of the auxiliary transmitting electrode 820 is larger than the area of the second electrode 220.

The fingerprint sensing IC 600 also comprises a plurality of contacts 620, where part of the contacts 620 electrically connect with the connection wires 240, 440, 840 of the second electrodes 220, the first electrodes 420 and the auxiliary transmitting electrodes 820.

The mutual-capacitance sensing circuit 640 (as shown in FIG. 1) sequentially or randomly applies a transmitting signal to at least one selected second electrodes 220 of the second electrode layer 200, applies an auxiliary transmitting signal with phase same as that of the transmitting signal to the auxiliary transmitting electrode 820 corresponding to the at least one selected second electrodes 220, and sequentially or randomly receives a fingerprint sensing signal from at least one first electrode 420.

Figure 15A:
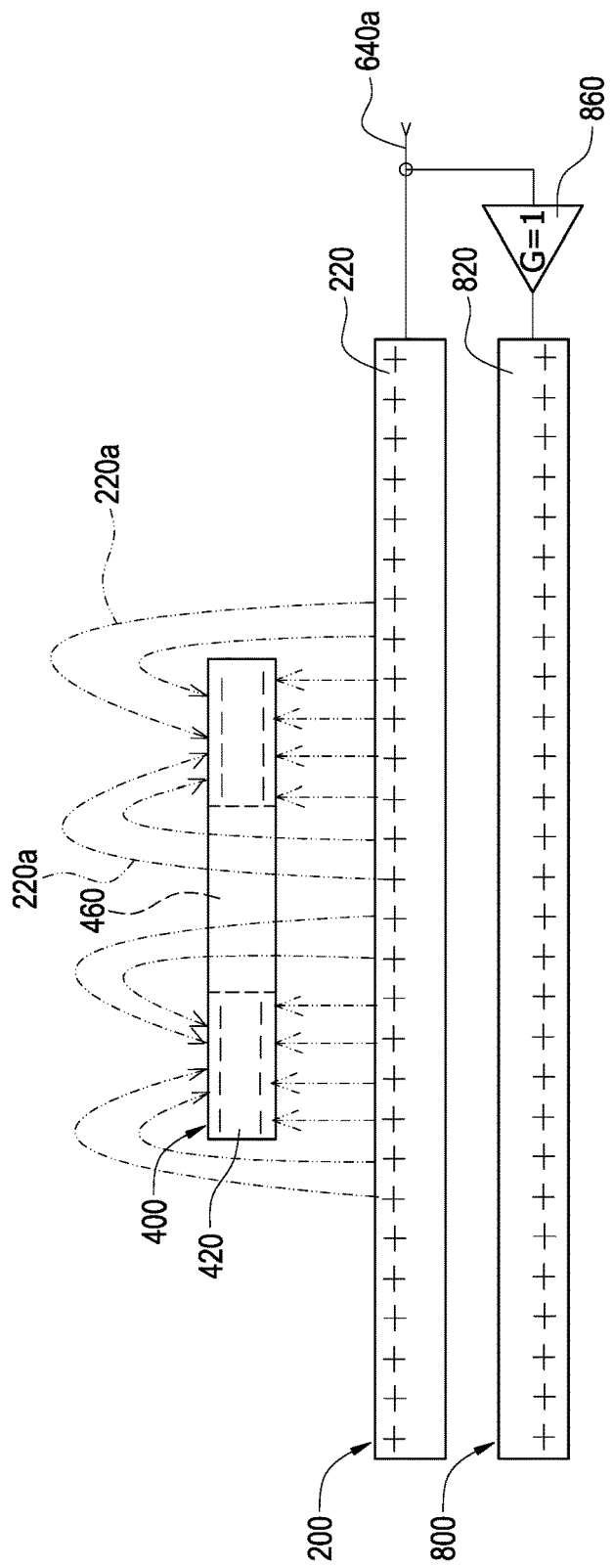

FIGS. 15a and 15b are schematic views showing the flowing status of electric field lines when the fingerprint identification apparatus is not touched and is touched by finger according to the eighth embodiment of the present invention. As shown in those figures, the second electrode layer 200 is transmitting electrode layer and the first electrode layer 400 is receiving electrode layer, while the auxiliary transmitting electrode layer 800 is arranged below the second electrode layer 200.

The mutual-capacitance sensing circuit 640 (as shown in FIG. 13) sequentially or randomly applies a transmitting signal 640a to the second electrodes 220 of the second electrode layer 200, and applies an auxiliary transmitting signal (processed by the non-inverting amplifier 860) with phase same as that of the transmitting signal 640a to the auxiliary transmitting electrode 820. Therefore, part of the electric field lines 220a (generated by the second electrodes 220) directly flow to one face of the first electrode 420 and are received by the first electrode 420, another part of the electric field lines 220a detour the edge of the first electrode 420 and are then received by the another face of the first electrode 420, still another part of the electric field lines 220a pass the openings 460 or detour the edges of the openings 460 and are then received by another face of the first electrode 420.

Therefore, when user finger 20 touches or approaches the first electrode layer 400, the electric field lines 220a originally detouring the edge of the first electrode 420 (or originally detouring the edge of the openings 460 or passing the openings 460) will be influenced by the touching or approaching finger 20 and corresponding capacitance change occurs to facilitate the sensing of fingerprint. Due to the design of the auxiliary transmitting electrodes 820, it is possible to ensure that all of the electric field lines 220a are projected upward to the first electrode layer 400 without causing the electric field lines 220a to project downward. At the same time, the auxiliary transmitting electrode layer 800 can prevent the second electrode layer 200 from being interfered by the signals from lower side. Therefore, the auxiliary transmitting electrodes 820 enhance the fingerprint sensing sensitivity and accuracy.

By the design and provision of the openings 460, the number of the effective electric field lines and the effective mutual capacitance changes can be increased to enhance the fingerprint sensing accuracy.

Figure 16:
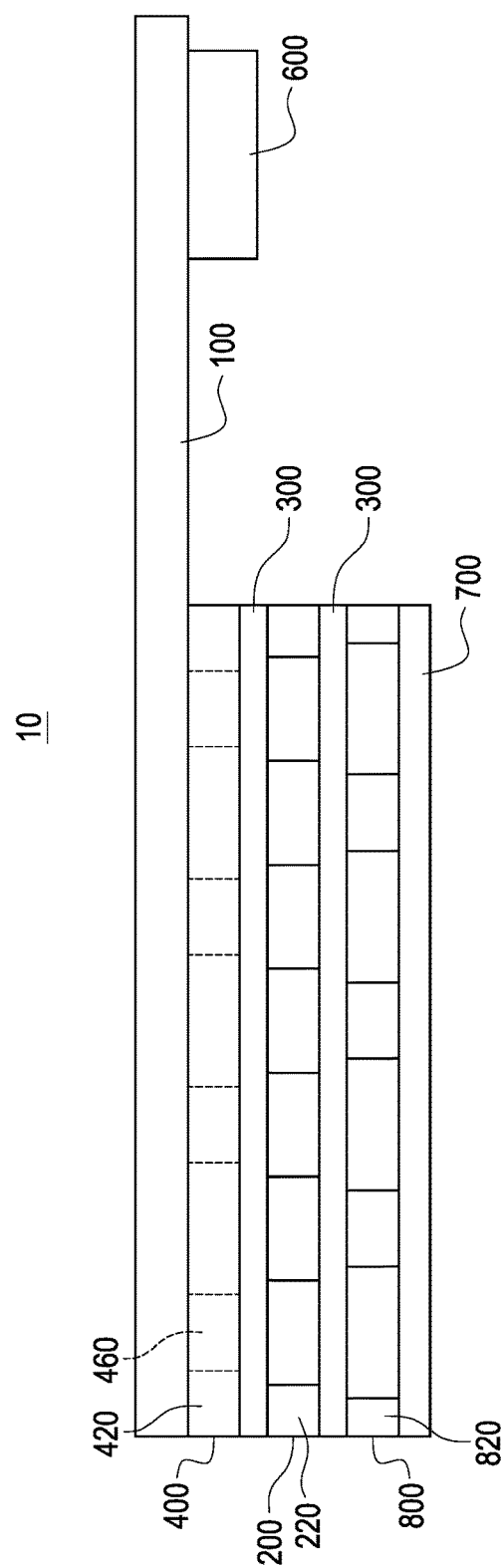
FIG. 16 is a sectional view of the fingerprint identification apparatus according to the ninth embodiment of the present invention.

FIG. 16 is a sectional view of the fingerprint identification apparatus according to the ninth embodiment of the present invention. The embodiment shown in this figure is similar to the embodiment shown in FIGS. 13, 14, 15a, and 15b. However, in the embodiment shown in FIG. 16, the substrate 100 of the fingerprint identification apparatus 10 is arranged on one side of the first electrode layer 400 and employed as the protection layer or the decoration layer of the fingerprint identification apparatus. The second electrode layer 200 receives the transmitting signal sent from the mutual-capacitance sensing circuit 640 (as shown in FIG. 13) of the fingerprint sensing IC 600 and then generates electric field lines (not shown) directed toward the first electrodes 420 of the first electrode layer 400. Therefore, when user finger touches or approaches the first electrode layer 400, the electric field lines originally detouring the edge of the first electrode 420 (or originally detouring the edge of the openings 460 or passing the openings 460) will be influenced by the touching or approaching finger and corresponding capacitance change occurs to facilitate the sensing of fingerprint.

When the substrate 100 is employed as the protection layer or decoration layer, the fingerprint identification apparatus 10 has a packaging layer 700 on a face of the second electrode layer 200. The packaging layer 700 is used to prevent the second electrode layer 200 of the fingerprint identification apparatus 10 from moisture or damage by foreign object.

Thus, particular embodiments have been described. Other embodiments are within the scope of the following claims. For example, the actions recited in the claims may be performed in a different order and still achieve desirable results.

What is claimed is:
1. A fingerprint identification apparatus, comprising:
a substrate;
a plurality of parallel first electrodes, at least part of the first electrodes having a plurality of openings or dents, wherein each of the first electrodes is of elongated shape and extended along a first direction, the dents are defined on at least one lateral side of the first electrode and do not separate the first electrode along the first direction, the openings are defined within the first electrode and do not separate the first electrode along the first direction such that signal can transmit along the first direction for the whole first electrode;
a plurality of parallel second electrodes extended along a second direction different with the first direction;
wherein the first electrodes and the second electrodes are cross to each other from projected view and the open- ings or dents are defined at overlapped regions of the first electrodes and the second electrodes from the projected view.

2. The fingerprint identification apparatus in claim 1, further comprising an insulation layer between the first electrodes and the second electrodes to electrically isolate the first electrodes and the second electrodes.

3. The fingerprint identification apparatus in claim 1, wherein the first electrodes are arranged on a side of the second electrodes toward user finger.

4. The fingerprint identification apparatus in claim 3, further comprising a plurality of auxiliary transmitting electrodes, the auxiliary transmitting electrodes being in one by one relationship with the second electrodes and arranged on a side of the corresponding second electrode opposite to the user finger.

5. The fingerprint identification apparatus in claim 1, further comprising a plurality of connection wires and a plurality of contacts, part of the connection wires and the contacts being corresponding to and electrically connected to the first electrodes or the second electrodes.

6. The fingerprint identification apparatus in claim 1, further comprising a fingerprint sensing integrated circuit (IC) having a plurality of contacts, part of the contacts being electrically connected to the first electrodes and the second electrodes.

7. The fingerprint identification apparatus in claim 1, wherein the substrate is a glass substrate, a ceramic substrate, a polymer substrate or a sapphire substrate.

8. The fingerprint identification apparatus in claim 1, wherein the substrate is a protection cover of a display screen.

9. The fingerprint identification apparatus in claim 1, wherein the first electrodes are substantially perpendicular to the second electrodes.

10. The fingerprint identification apparatus in claim 1, wherein at least part of the second electrodes have a plurality of openings or a plurality of dents defined at the overlapped regions, wherein locations of the openings or dents of the second electrodes are complementary with locations of the openings or dents of the first electrodes.

11. The fingerprint identification apparatus in claim 6, wherein the fingerprint sensing integrated circuit (IC) comprises at least one mutual-capacitance sensing circuit, the mutual-capacitance sensing circuit is configured to sequentially or randomly apply a transmitting signal to at least one of the first electrodes and sequentially or randomly receive a fingerprint sensing signal from at least one of the second electrodes.

12. The fingerprint identification apparatus in claim 6, wherein the fingerprint sensing integrated circuit (IC) comprises at least one mutual-capacitance sensing circuit, the mutual-capacitance sensing circuit is configured to sequentially or randomly apply a transmitting signal to at least one of the second electrodes and sequentially or randomly receive a fingerprint sensing signal from at least one of the first electrodes.

13. The fingerprint identification apparatus in claim 4, further comprising a fingerprint sensing integrated circuit (IC) having a plurality of contacts, part of the contacts being electrically connected to the first electrodes, the second electrodes and the auxiliary transmitting electrodes.

14. The fingerprint identification apparatus in claim 13, wherein the fingerprint sensing IC comprises at least one mutual-capacitance sensing circuit, the mutual-capacitance sensing circuit is configured to sequentially or randomly apply a transmitting signal to at least one of the second electrodes, apply an auxiliary transmitting signal with the same phase as the transmitting signal to the corresponding auxiliary transmitting electrode and sequentially or randomly receive a fingerprint sensing signal from at least one of the first electrodes.

15. The fingerprint identification apparatus in claim 6, wherein the fingerprint sensing IC is pressed on the substrate through anisotropic conductive film (ACF).

16. The fingerprint identification apparatus in claim 6, wherein the fingerprint sensing IC is fingerprint sensing IC chip and soldered to the substrate through low-melting-temperature alloy material.

17. The fingerprint identification apparatus in claim 6, wherein the fingerprint sensing IC is fingerprint sensing IC chip and arranged on a flexible circuit board, the flexible circuit board is pressed on or soldered to the substrate.

18. The fingerprint identification apparatus in claim 13, wherein the fingerprint sensing IC is fingerprint sensing IC chip and pressed on the substrate through anisotropic conductive film (ACF).

19. The fingerprint identification apparatus in claim 13, wherein the fingerprint sensing IC is fingerprint sensing IC chip and soldered to the substrate through low-melting-temperature alloy material.

20. The fingerprint identification apparatus in claim 13, wherein the fingerprint sensing IC is fingerprint sensing IC chip and arranged on a flexible circuit board, the flexible circuit board is adhered to or soldered to the substrate.

* * * * *